United States Patent
Xie et al.

(10) Patent No.: US 12,449,605 B2
(45) Date of Patent: Oct. 21, 2025

(54) SYSTEM, APPARATUS AND METHOD FOR INTEGRATING LASER AND OPTICAL CIRCUITRY ON A PHOTONICS INTEGRATED CIRCUIT USING AN ASSEMBLY HAVING A PRISM AND ISOLATOR

(71) Applicant: Intel Corporation, Santa Clara, CA (US)

(72) Inventors: Boping Xie, San Ramon, CA (US); Jonathan Doylend, Morgan Hill, CA (US); Alexander Krichevsky, Cupertino, CA (US)

(73) Assignee: Intel Corporation, Santa Clara, CA (US)

(*) Notice: Subject to any disclaimer, the term of this patent is extended or adjusted under 35 U.S.C. 154(b) by 807 days.

(21) Appl. No.: 17/483,059

(22) Filed: Sep. 23, 2021

(65) Prior Publication Data

US 2022/0011519 A1 Jan. 13, 2022

(51) Int. Cl.
*G02B 6/34* (2006.01)
*H01S 3/00* (2006.01)

(52) U.S. Cl.
CPC .............. *G02B 6/34* (2013.01); *H01S 3/0064* (2013.01)

(58) Field of Classification Search
CPC ................................ G02B 6/34; H01S 3/0064
See application file for complete search history.

(56) References Cited

U.S. PATENT DOCUMENTS

| | | |
|---|---|---|
| 10,598,875 B2 | 3/2020 | Xie |
| 10,852,491 B2 | 12/2020 | Krichevsky |
| 2017/0099721 A1* | 4/2017 | Tao ........................ H01S 3/0064 |
| 2018/0331486 A1* | 11/2018 | Li .......................... H01S 3/0071 |
| 2019/0049985 A1 | 2/2019 | Doylend |
| 2019/0123109 A1 | 4/2019 | Xie et al. |
| 2020/0012055 A1* | 1/2020 | Ye ....................... G02B 6/29367 |
| 2020/0284988 A1* | 9/2020 | Tanaka ................. G02B 6/3556 |
| 2021/0058159 A1 | 2/2021 | Krichevsky et al. |
| 2021/0294040 A1* | 9/2021 | Sakai ..................... G02B 6/4246 |

* cited by examiner

*Primary Examiner* — Tina Wong
(74) *Attorney, Agent, or Firm* — Essential Patents Group, LLP

(57) ABSTRACT

In one embodiment, a package includes: a substrate; a photonic integrated circuit (PIC) adapted to the substrate, the PIC including at least one optical circuit, a first plurality of waveguides, a second plurality of waveguides, and a laser to output optical energy via the first plurality of waveguides; and a prism assembly adapted to the substrate to reflect the optical energy output from the first plurality of waveguides to the second plurality of waveguides, the prism assembly including a prism and at least one isolator. Other embodiments are described and claimed.

17 Claims, 11 Drawing Sheets

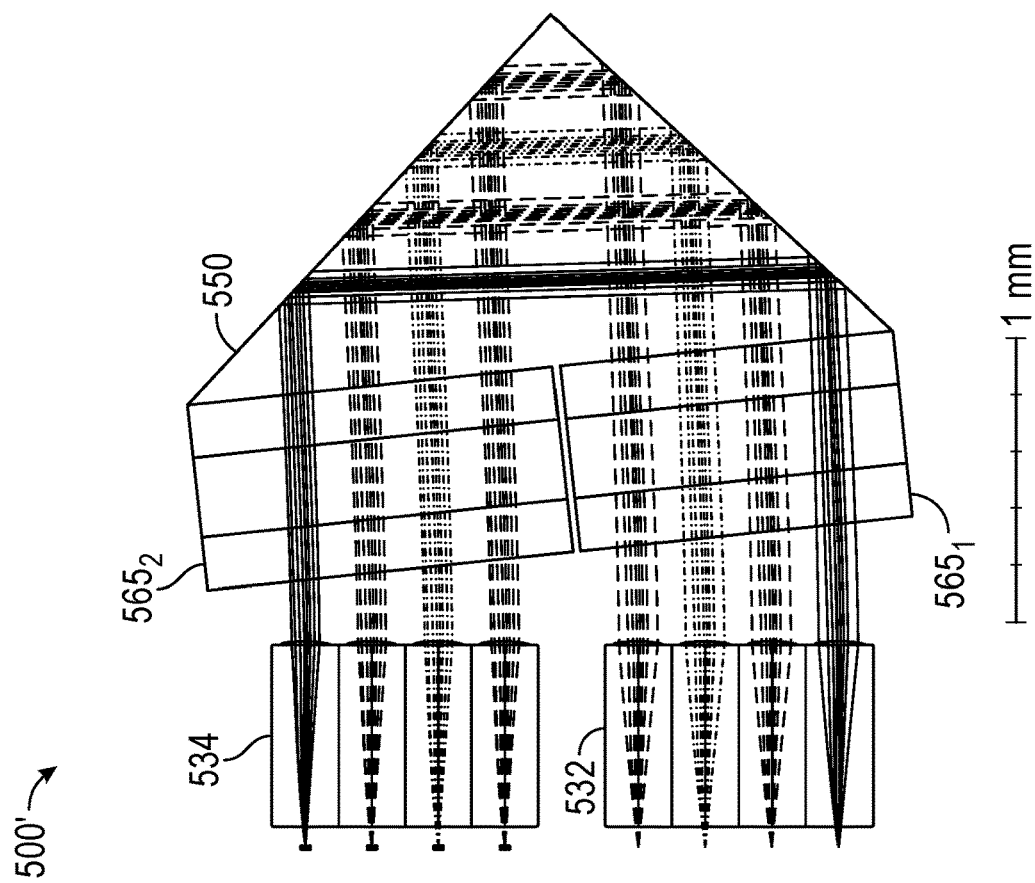
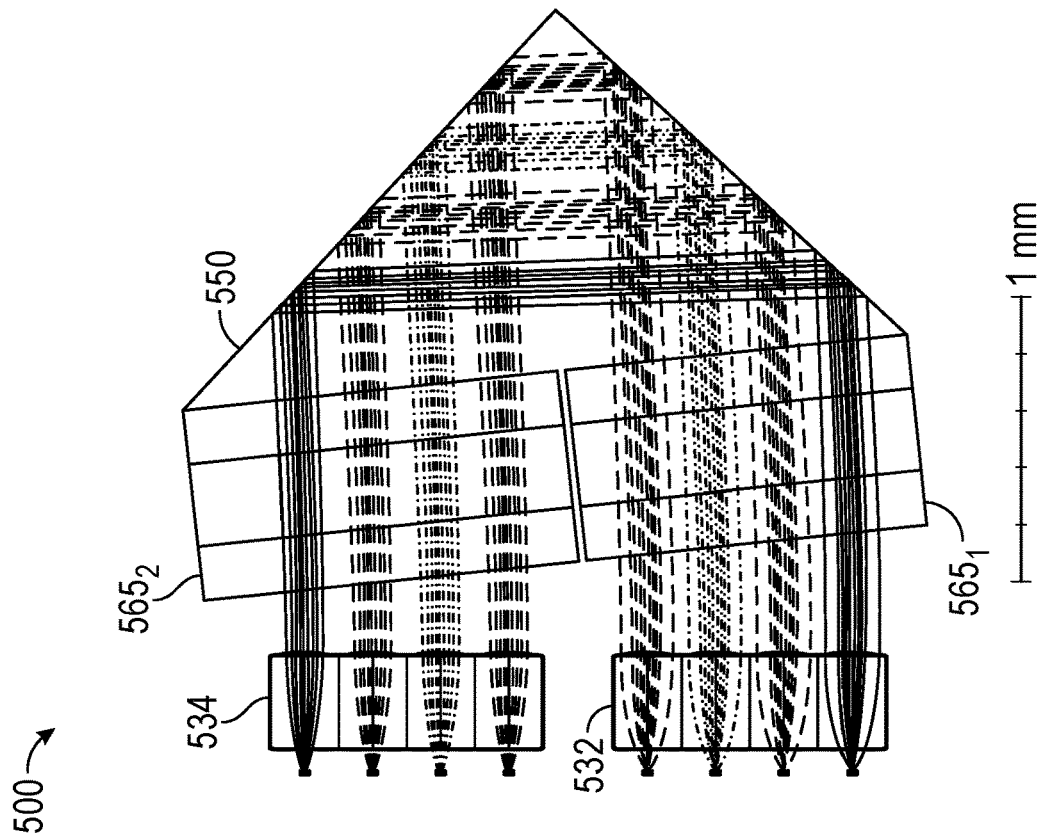

SYSTEM, APPARATUS AND METHOD FOR INTEGRATING LASER AND OPTICAL CIRCUITRY ON A PHOTONICS INTEGRATED CIRCUIT USING AN ASSEMBLY HAVING A PRISM AND ISOLATOR

BACKGROUND

To operate a photonic integrated circuit (PIC), an input laser source is needed. In addition, an optical isolator is present to block reflection from the PIC from reaching the laser. The lack of an available on-chip optical isolator leads to separate laser sources and PIC, which are connected through an optical fiber and connectors. While implementations can vary, with these components and the addition of fiber and connectors, a resulting package can have quite large physical size and be expensive.

BRIEF DESCRIPTION OF THE DRAWINGS

FIGS. 5A-5C are example arrangements of prism assemblies aligned to lens assemblies in accordance with embodiments.

DETAILED DESCRIPTION

In various embodiments, an optical device such as a light detection and ranging (LiDAR) sensor, optical transceiver or so forth, can be provided in a package that includes at least one photonic integrated circuit (PIC) and a closely adapted off-chip retroreflector prism. In addition, one or more isolators can be included in an optical path near a laser (which may be implemented within the PIC), effectively blocking back reflection to the laser. As a result, integration of the laser source onto the PIC is enabled. With embodiments, one or more fibers and connectors as present in a conventional approach can be avoided, resulting in a much-reduced footprint and lower cost solution.

In a particular embodiment, a single lens array may be adapted to a side of the PIC, with a portion of the lenses of the lens array operating to collimate light output from the PIC. In turn, a prism assembly may be adapted on a common substrate with the PIC and in close proximity to waveguides that communicate the light.

The prism assembly may include a 90° retroreflector prism that turns incoming light 180° while maintaining parallelism and channel pitch. The resulting reflected light travels on an optical path including another portion of lenses of the lens array to focus collimated light back into the PIC, and more particularly to waveguides that couple to optical circuitry of the PIC. Between retroreflector prism and lens array, an isolator can be placed in the collimated light path to block back reflection to laser. In fact, an isolator can be placed in both incoming and exiting optical paths, to form a dual-stage isolator for extra isolation protection, in certain embodiments.

Thus with embodiments, a PIC may include integrated optical circuitry (e.g., LiDAR circuitry) and a laser source in one monolithic photonic chip, while providing isolation for the laser to maintain its performance. By eliminating fiber-related components, the packaging footprint and number of components are reduced, resulting in a simpler and more compact design.

Figure 1:
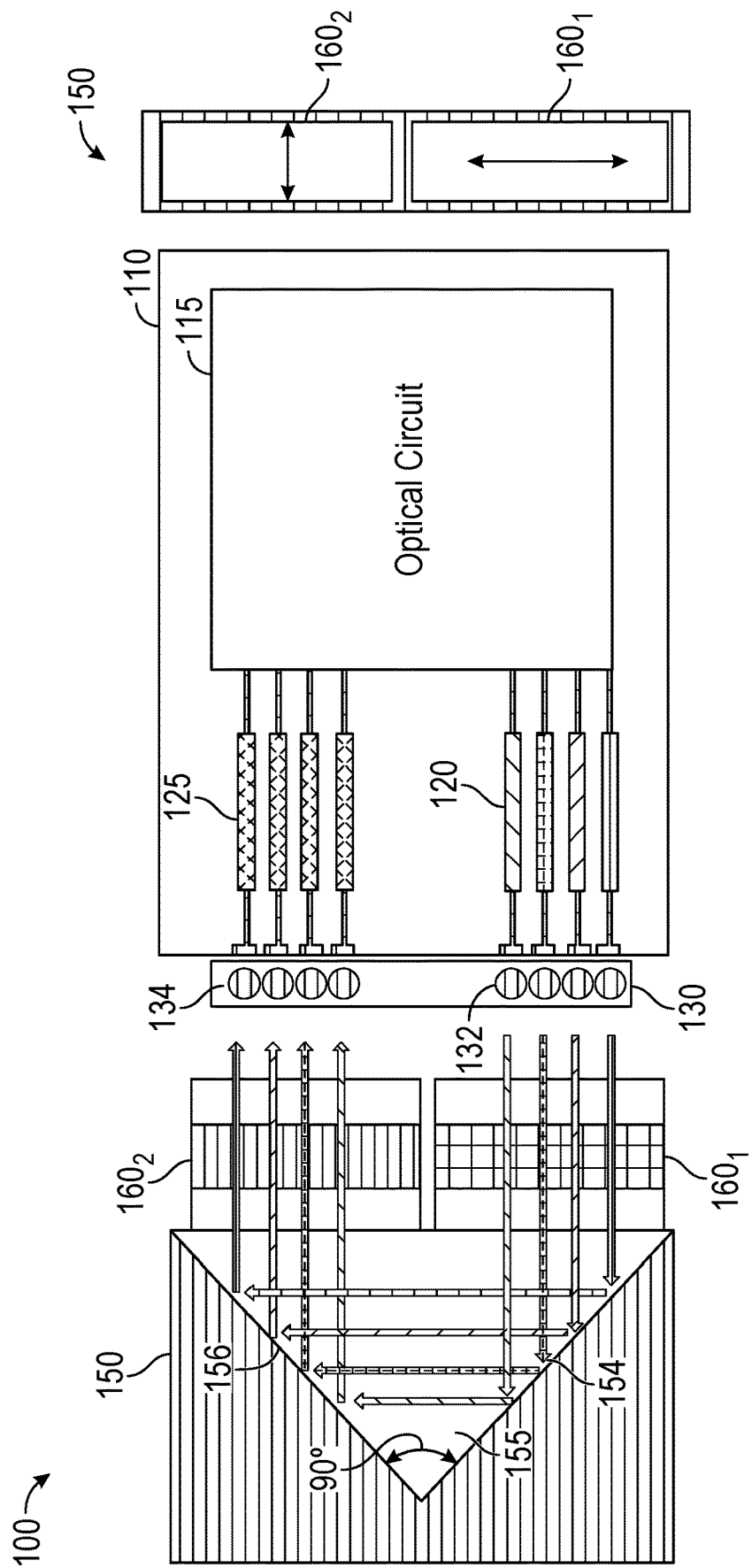
FIG. 1 is a block diagram of a device in accordance with an embodiment.

Since the 90° retroreflector prism maintains the parallelism and pitch of the incoming and exiting beam, alignment processes can be greatly simplified. After a lens is attached to the PIC, the only additional alignment processes with tight control are prism pitch angle and movement in the direction parallel to lens pitch in order to couple light into the proper channel Referring now to FIG. 1, shown is a block diagram of a device in accordance with an embodiment. As shown in FIG. 1, device 100 may be one of a variety of different optical products such as a LiDAR chip, an optical transceiver or so forth. More specifically as shown in FIG. 1, device 100 is implemented as a package that includes a photonic integrated circuit (PIC) 110 having at least one lens array 130 adapted thereto. In addition, the packaged device further includes a prism assembly 150 having a prism 155 and one or more isolators $160_{1,2}$ adapted thereto. In turn, all these components may be adapted on a common substrate (not shown in FIG. 1), which may have a coefficient of thermal expansion (CTE) that closely aligns with one or more of PIC 110 and prism assembly 150. In a particular embodiment, the substrate has a CTE close to silicon or between silicon and glass (such as low-CTE ceramic or borosilicate glasses like Pyrex, or an optical glass such as BK7), which in turn may be used as the material used for prism 155.

In the high level view shown in FIG. 1, PIC 110 includes an optical circuit 115. In different implementations, optical circuit 115 may take the form of LiDAR circuitry, optical transceiver circuitry or so forth. In certain implementations, multiple optical circuits may be present, where the circuits may be homogeneous or heterogeneous circuits.

As further illustrated, PIC 110 also includes a laser assembly 120. In embodiments herein, laser assembly 120 may include a plurality of narrow linewidth lasers. Laser assembly 120 may be configured to output optical energy via a plurality of waveguides (generally illustrated at item 120). In the embodiment shown, four waveguides may be present, each associated with a given channel. However, understand that embodiments are not limited in this regard and in other implementations more or fewer channels may be present, and different pitches are possible. Furthermore, understand that the generated optical energy may be of the same wavelength or of different wavelengths, depending upon implementation.

As shown, the waveguides output the optical energy at an edge of PIC 110 through a first portion 132 of lens array 130. As will be described further herein, lens array 130 may be actively aligned in adaptation to PIC 110 during manufacture to ensure effective collimation of the light output. Light between lens array 130 and prism 155 is nearly collimated. Due to the insensitive nature of the collimated zone, isolator $160_1$ can be passively placed or attached to prism 155 as one assembly to provide the back-reflection isolation for the laser source.

As shown, this collimated light passes through a first isolator 160₁ and into prism 155. Prism 155 may be formed of a glass or other light transmitting material, and is formed to have a first face 154 and a second face 156, such that a 90 degree angle is formed between the faces. Although FIG. 1 shows a prism surface that is 90° perpendicular to incoming light, in some implementations, it can be tilted with an angle to incoming light to further reduce back reflection.

Thus as shown, after collimation in first portion 132, incoming collimated light is reflected off of face 154 towards face 156, and is reflected again off of face 156 to be passed through second isolator 160₂. Note that the presence of multiple isolators is optional and in other implementations, there may be no second isolator.

In any case, the reflected light passes through a second portion 134 of lens array 130. In an embodiment, second portion 134 may be implemented as an edge illuminating taper (EIT) array. In turn, the reflected light passes through a semiconductor optical amplifier (SOA) array 125, which may be formed of a plurality of waveguides. The resulting isolated light of each of the channels may be provided to optical circuit 115.

Note that while a single lens assembly 130 is present, in other cases independent arrays may be provided at the input and output of a PIC. For example, if matching different Numerical Aperture (NA) waveguide sets is desired, a single lens array may be replaced by two separate (collimating and focusing) lens arrays. Such lens arrays may differ in both lens parameters (radii of curvature, conic constants, thicknesses) and material (e.g., silicon and glass).

As further illustrated in the inset in FIG. 1 according to a side view of prism assembly 150, the light input into isolator 160₁ may have a horizontal (typical for transverse electrical (TE) mode lasers) input polarization and instead when the light is output from second isolator 160₂ it may have a vertical-polarization, i.e., a 90 degree polarization change occurs. As will be described further below, certain variations may address this polarization change. Understand while shown at this high level in the embodiment of FIG. 1, many variations and alternatives are possible.

Referring now to FIGS. 2A-2D, shown are possible implementations of a prism assembly in accordance with different embodiments. More specifically in FIG. 2A, a simplified view of a prism 255 is shown, along with optical isolators 260₁ and 260₂. These components may be generally similarly configured the same as system 100 of FIG. 1 (and thus reference numerals generally refer to the same components, albeit of the "200" series in place of the "100" series of FIG. 1).

In this arrangement, isolators 260 may have same magnetization direction such that a polarization change of 90 degrees occurs as light passes through. With this arrangement, the outgoing polarization of the light beams are normal to the incoming beams.

Figure 2A:
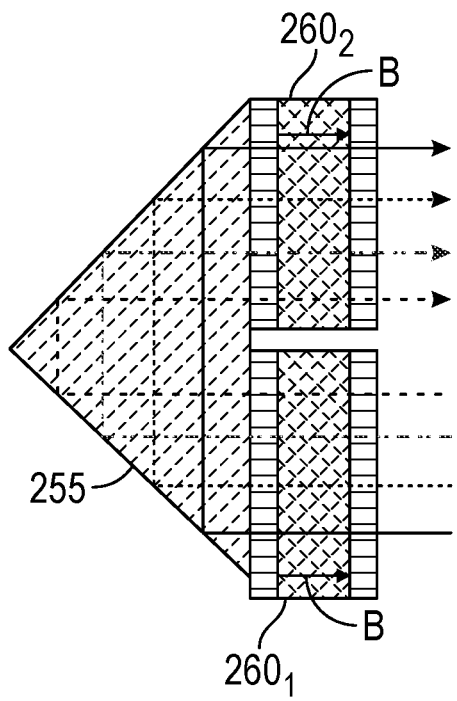
FIGS. 2A-2D are illustrations of possible implementations of a prism assembly in accordance with different embodiments.
Figure 2B:
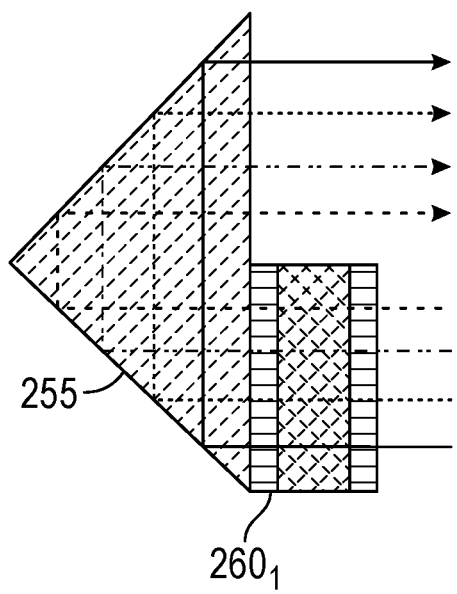

In FIG. 2B, an implementation is shown in which only a single isolator 260₁ is present. With this implementation, the polarization of the outgoing beam is at 45 degrees to that of the incoming beam. Since the outgoing beam is to be coupled into the same type of a waveguide, this arrangement may not be ideal if the waveguide exhibits Polarization Dependent Loss (PDL).

Figure 2C:
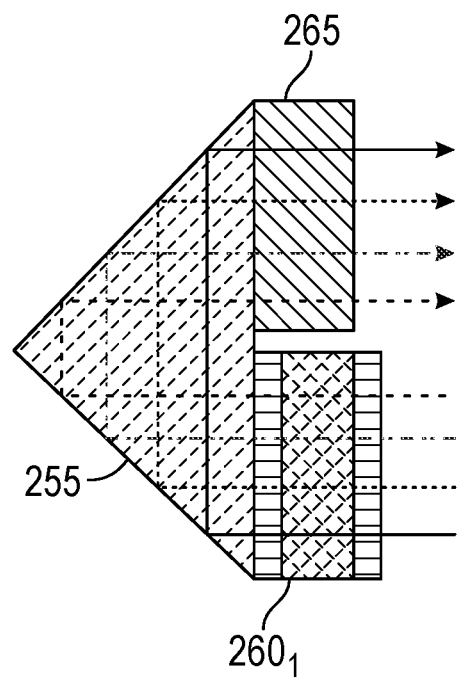

Next referring to FIG. 2C, an implementation is shown in which there is a single isolator 260₁ and a polarization rotator 265, which in an embodiment may be implemented as a half-wave plate, to avoid additional losses. Rotator 265 may rotate the polarization angle by double the angle of the plate orientation with respect to the incoming beam. Note that this rotator can be added to a single-isolator implementation as in FIG. 2C or a dual-isolator implementation to ensure the desired polarization state of the outgoing beam.

Figure 2D:
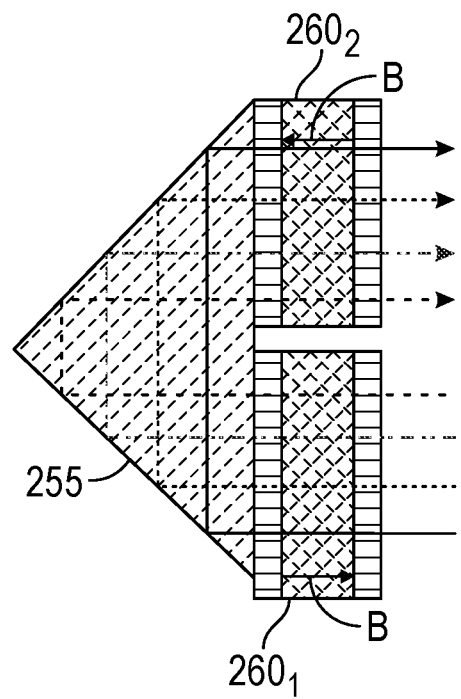

Note that optical isolators may be magnetized at the last stage of the assembly, but they can also be magnetized prior to attachment to the prism. In that case, if two isolators of the dual-stage scheme are magnetized in opposite directions as shown in FIG. 2D, the polarization of the outgoing beam is parallel to the polarization of the incoming beam. By way of isolators 260₁ and 260₂ having opposite orientation, parallel polarization between incoming light and outgoing light occurs. Of course while shown with these different implementations, for purposes of illustration, understand that additional implementations of a prism assembly are possible in other embodiments.

As briefly described above, during manufacturing an active alignment process may be performed to align one or more lens assemblies with a PIC. This alignment process may be performed so that beams are nearly collimated within a prism/isolator combination, to ensure proper collimation and beam direction of all beams within an array.

Figure 3:
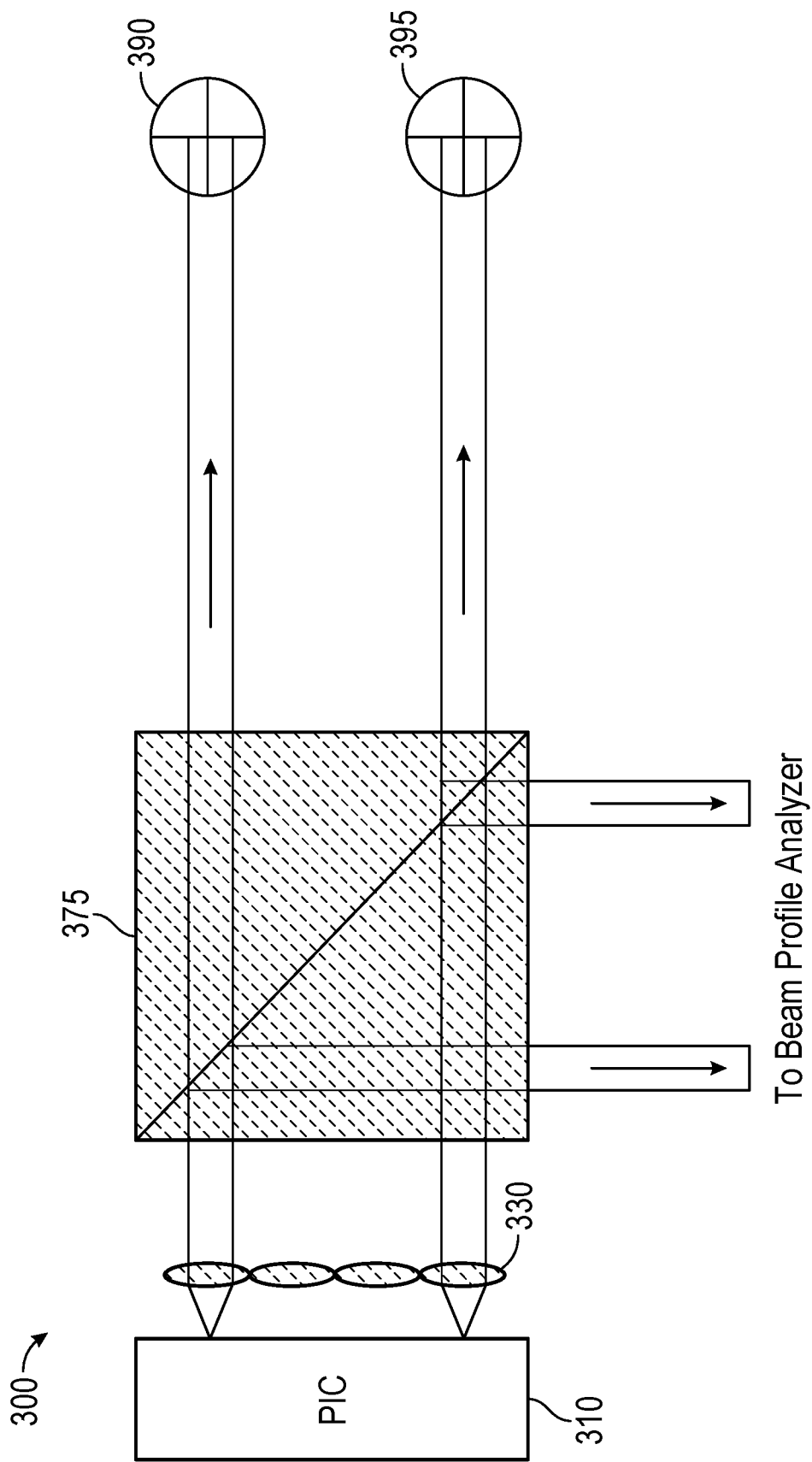
FIG. 3 is a block diagram of a manufacturing environment in accordance with an embodiment.

Referring now to FIG. 3, shown is a block diagram of a manufacturing environment in accordance with an embodiment. As shown in FIG. 3, in a manufacturing environment 300, a lens array 330 may be adapted to a PIC 310. To ensure appropriate alignment so that accurate collimation may occur during operation, an active alignment process may occur. In this active alignment process, PIC 310 is powered on to output light which in turn passes through the individual lenses of lens array 330. In turn, the light passes through a beam splitter 375. Beam splitter 375 splits the incoming beams into first beams of free flight that are directed to position detectors 390, 395, which may be implemented as quadrant detectors. In addition, the split beams are also provided to a beam profile analyzer (not shown for ease of illustration in FIG. 3).

Thus after (at least two) lasers within an array are energized, the lens is actively aligned to the distant position detectors such as quadrant detectors. Aligning the centroid of the beams to distant detectors ensures correct lateral position and roll of the lens.

Beam collimation may be analyzed by a profile analyzer. There are many ways to characterize the degree of collimation of the beams including but not limited to: a system of photodiodes and apertures (may include separate beam splitters); an infrared camera sensor (which may be combined with extra beam splitters and photodiodes); a shearing interferometer; or knife edge/slit/imaging beam profilers. For instance, if a camera sensor is used, having beam spots of the same size ensures proper yaw angle of the lens. Having the spot size corresponding to that of the desired divergence of the (nearly collimated) beams ensures proper focus position of the lens. Note that the alignment is not very sensitive to the lens pitch rotation, so the holder position gauge and/or a side view camera can be sufficient to control the pitch.

After the lens is properly aligned and attached to the PIC die, the prism/isolator assembly may be passively (under camera views) placed and attached to the substrate. However, in some designs demonstrating high sensitivity of the coupling efficiency to post-thermal shifts, and active prism alignment may be performed.

Figure 4A:
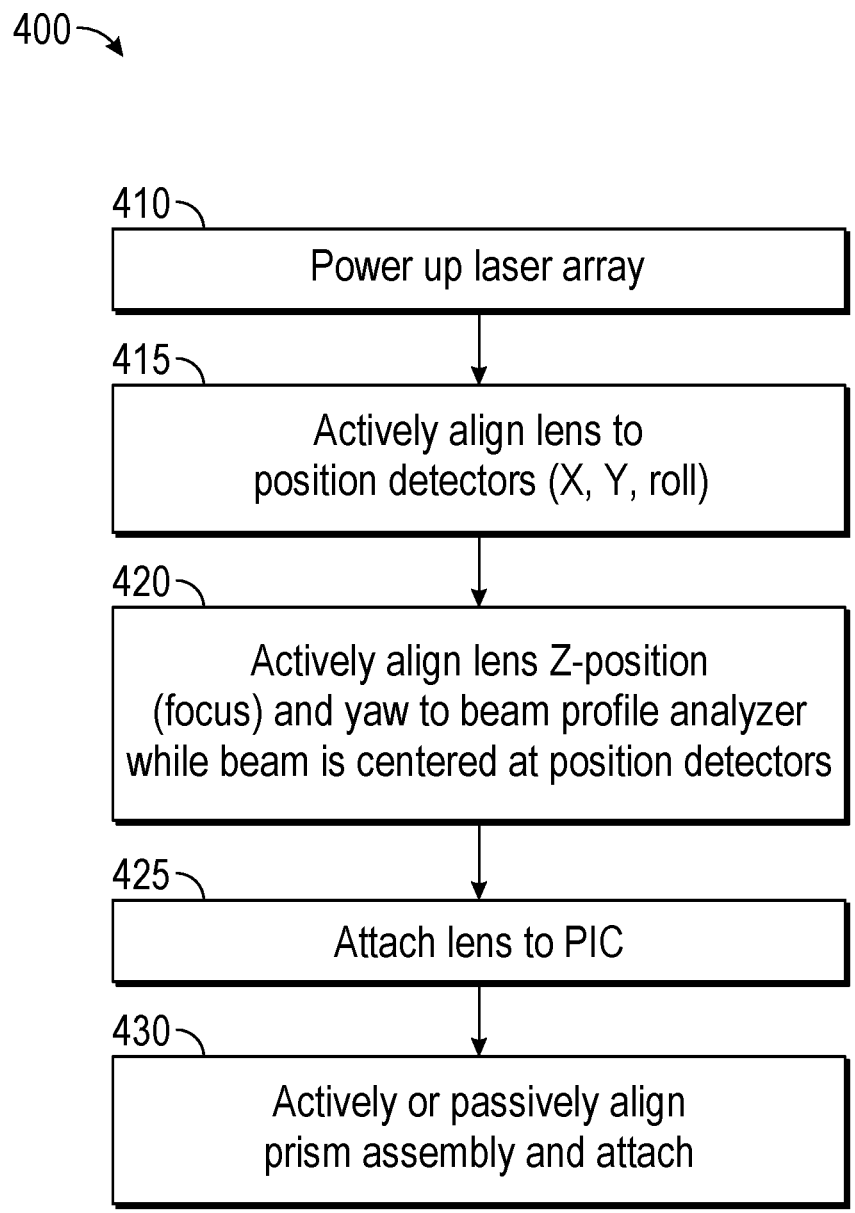
FIGS. 4A and 4B are flow diagrams of methods in accordance with embodiments.

Referring now to FIG. 4A, shown is a flow diagram of a method in accordance with an embodiment. More specifically, method 400 of FIG. 4A is a method for performing alignment of a package having a PIC and a prism assembly as described herein. Such alignment technique may be performed during manufacture of a packaged device.

As illustrated, method 400 begins by powering up a laser array (block 410). To this end, power may be provided to the PIC, which may already be adapted onto a substrate. As such, the laser array outputs light. Next, at block 415 a lens array may be actively aligned to position detectors, which may be positioned at a distance from the PIC. For example, quadrant detectors may be used. During this active alignment, the lens may be appropriately positioned with respect to the PIC in both X and Y directions as well as roll. Next at block 420, Z-position (focus) and yaw of the lens may be actively aligned to a beam profile analyzer. Note that this alignment portion may be performed while the beam remains centered at the position detectors. When correctly aligned, at block 425 the lens may be attached to the PIC. For example, the lens assembly may be affixed to an edge of the PIC by way of an epoxy or other adhesive material to join the lens assembly to the PIC. Finally, at block 430, the prism assembly may be aligned and attached. Note that this alignment process may be an active or passive process, as a potentially reasonable amount of tolerance may be permitted.

As such, the prism assembly can be adapted onto a common substrate with the PIC. Although embodiments may vary, in some cases the prism assembly may be located in close proximity to the PIC, e.g., within approximately two millimeters or less. Note that in some cases, there may be an angle between the prism assembly and the PIC to further prevent back reflections. In some cases, this angle may be up to approximately 6-8 degrees with respect to normal alignment.

While described with this implementation in FIG. 4A for an arrangement with a single lens array, it is further possible for an implementation to provide separate lens arrays. In such implementations, each of the lenses may be separately aligned with an active alignment process.

Figure 4B:
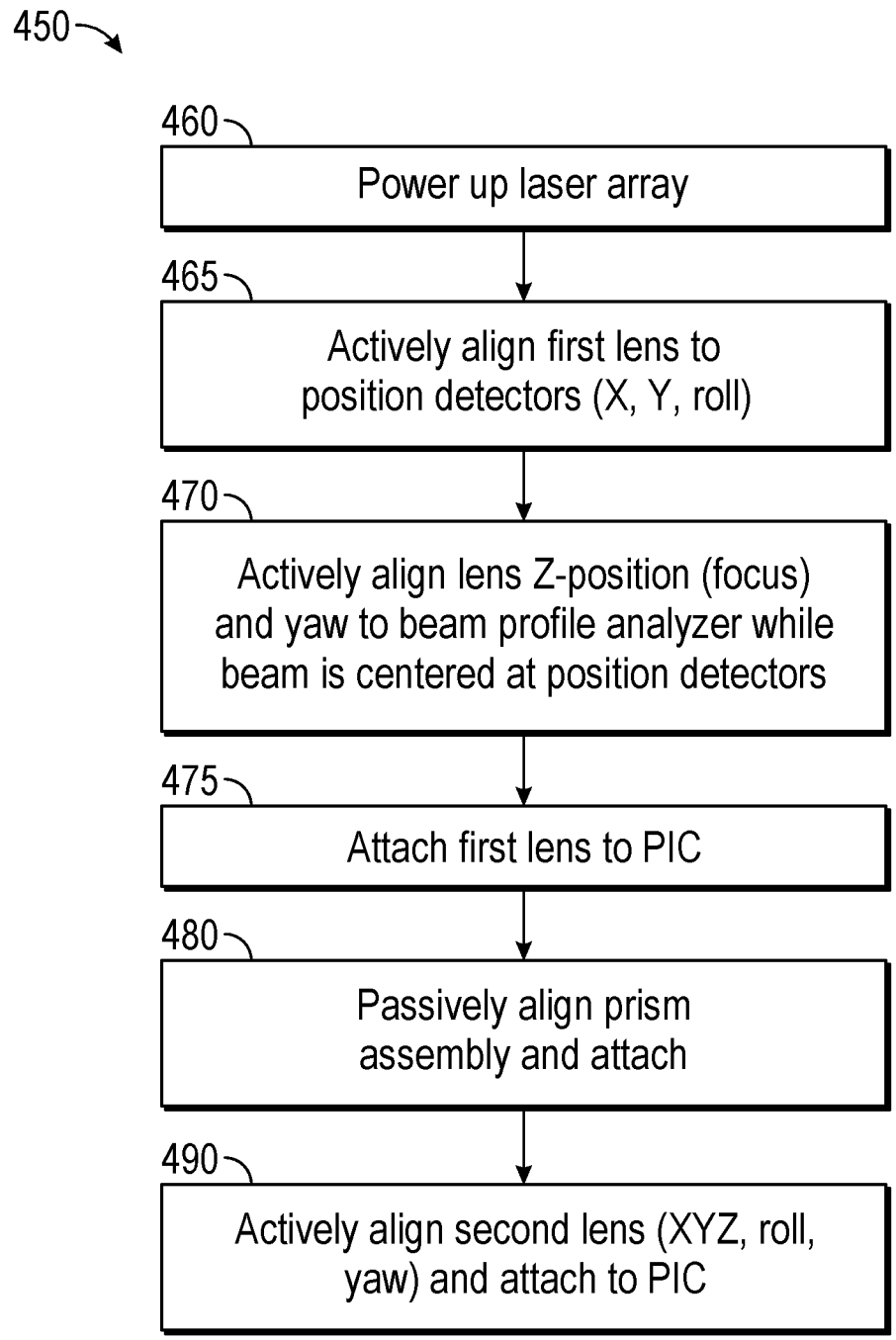

Referring now to FIG. 4B, shown is a flow diagram of a method in accordance with another embodiment. More specifically, method 450 of FIG. 4B is a method for performing alignment of a package having a PIC, independent lens arrays, and a prism assembly as described herein. In general, method 450 may proceed the same as method 400. However here note that different alignment processes are performed at different time points for the two different lens arrays.

More specifically, after a first laser array is powered up (block 460), actively aligned to position detectors (block 465) and actively aligned for Z-position (focus) and yaw to a beam profile analyzer (block 470), the first lens assembly may be attached to the PIC (block 475). At block 480, the prism assembly may be aligned (e.g., passively) and attached. Finally, at block 490 the second lens assembly can be actively aligned and attached to the PIC. Understand that of course other alignment processes can be performed in other embodiments.

With embodiments, much more compact and inexpensive packages may be enabled, allowing for small profile devices to be used in various use cases. While embodiments are not limited in this regard, packages in accordance with an embodiment can be used in LiDAR systems, optical transceivers and so forth.

Figure 5C:
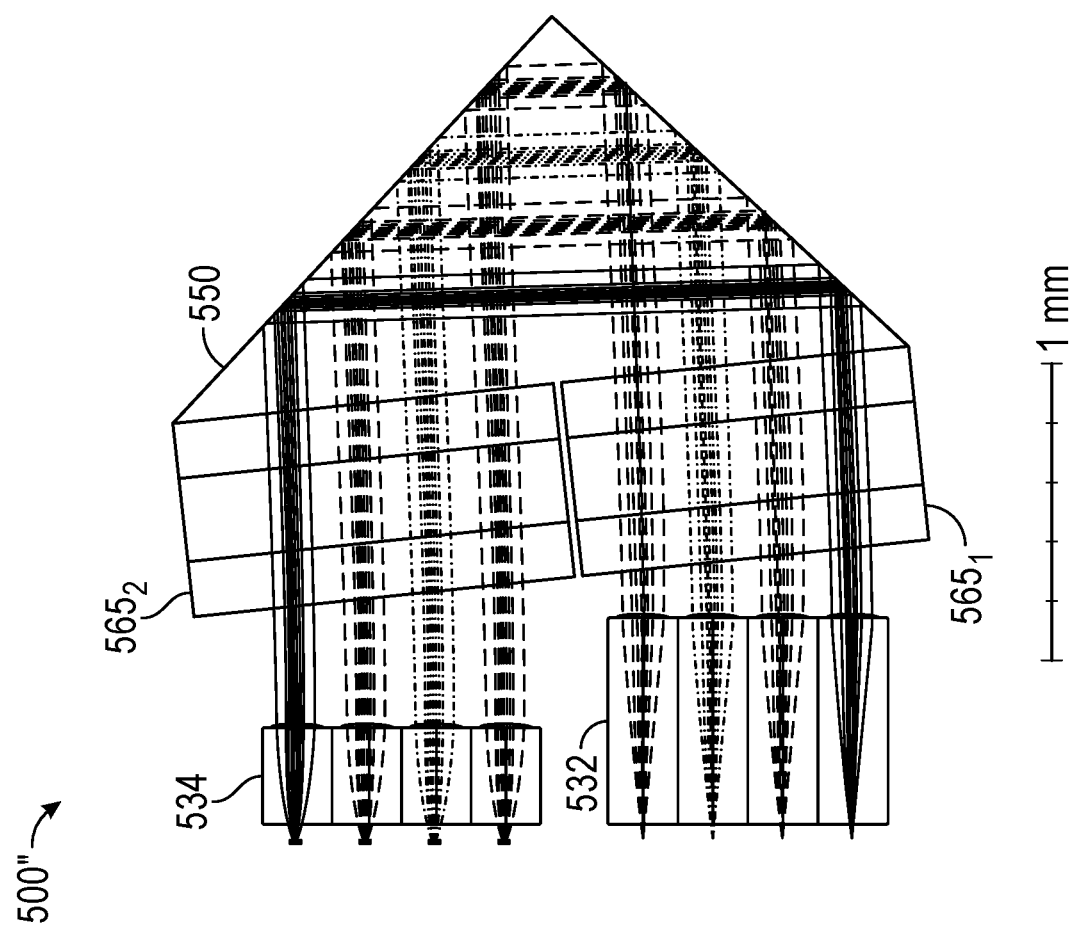

Referring now to FIGS. 5A-5C, shown are example arrangements of prism assemblies aligned to lens assemblies (and more generically PICs) in accordance with embodiments. More specifically as shown in FIG. 5A, a first configuration 500 may be for the case of a high NA source.

In general, this configuration is a part of the package shown in FIG. 1. As such, these components may be generally similarly configured the same as system 100 of FIG. 1 (and thus reference numerals generally refer to the same components, albeit of the "500" series in place of the "100" series of FIG. 1).

In this arrangement of FIG. 5A, a lens assembly having a first portion 532 and a second portion 534, which may be high NA lenses or parts of the same lens array, may be adapted in close relation to a prism assembly 550 having isolators 5651, 5652 and prism 555. FIG. 5A also shows an approximate scale, where the distance between the lens and prism assembly may be less than 1 millimeter, and as small as approximately 100 microns. More generally, embodiments may provide for a separation distance of less than approximately 2 millimeters. Note that in this configuration, an angle between approximately 4 and 8 degrees exists between parallel surfaces of lens assembly portions 532, 534 and prism assembly 550.

Similarly, in FIG. 5B, shows a second configuration 500' having low NA lenses. In turn, FIG. 5C shows yet another configuration 500' having a high NA lens 534 and a low NA lens 532. The cases of high NA source (NA=0.28 @ 1/e^2), low NA source (NA=0.09 @1/e⁻²), and mixed NAs (NAs of 0.28 and 0.09) were considered, as shown in FIGS. 5A-5C. In the mixed NA case, the lens materials on the high-NA and low-NA sides may differ. For the specific example shown in FIG. 5C, the high-NA side is silicon, and on the low-NA case it is glass (N-SF11), in an embodiment.

According to modeling, nominal coupling efficiency is the same at ~97% for these designs. However, the High-NA case shows much higher sensitivity to the lens shape and to its post-cure shift, as shown in Table 1 below, which is an illustration of coupling sensitivity to different parameters. The Low-NA case may be suitable for passive prism alignment, while the High-NA case may benefit from active alignment of the prism/isolator assembly.

TABLE 1

| Parameter | Units | NA = 0.28 | NA = 0.09 |
| --- | --- | --- | --- |
| Lens RoC | % | 1 | 3.2 |
| Lens Conic constant | | 1.5 | 3 |
| Lens post-thermal shift X | um | 0.5 | 1.4 |
| Lens post-thermal shift Y | um | 0.28 | 0.8 |
| Prism assembly X-shift | um | 11 | |
| Prism assembly Yaw | deg. | 0.5 | |
| Prism assembly Roll | deg. | 0.75 | |
| Prism assembly Pitch | deg. | 0.4 | |

As shown in Table 1, listed deviations from the nominal case cause 1 dB loss of coupling efficiency. Typically, the loss scales with the square of the deviation.

The tolerances for the mixed-NA 2 lens array case is not directly comparable to the single-array case (much looser, e.g., more than 10% RoC variation is allowed) due to an extra alignment step that can assure independent collimation, focusing, and steering of the beam on two sides. Although a 2-lens configuration may incur extra cost (of the lens and the time required for active alignment), it may be worth extra expense if the components cannot meet stringent tolerance requirements.

Figure 6:
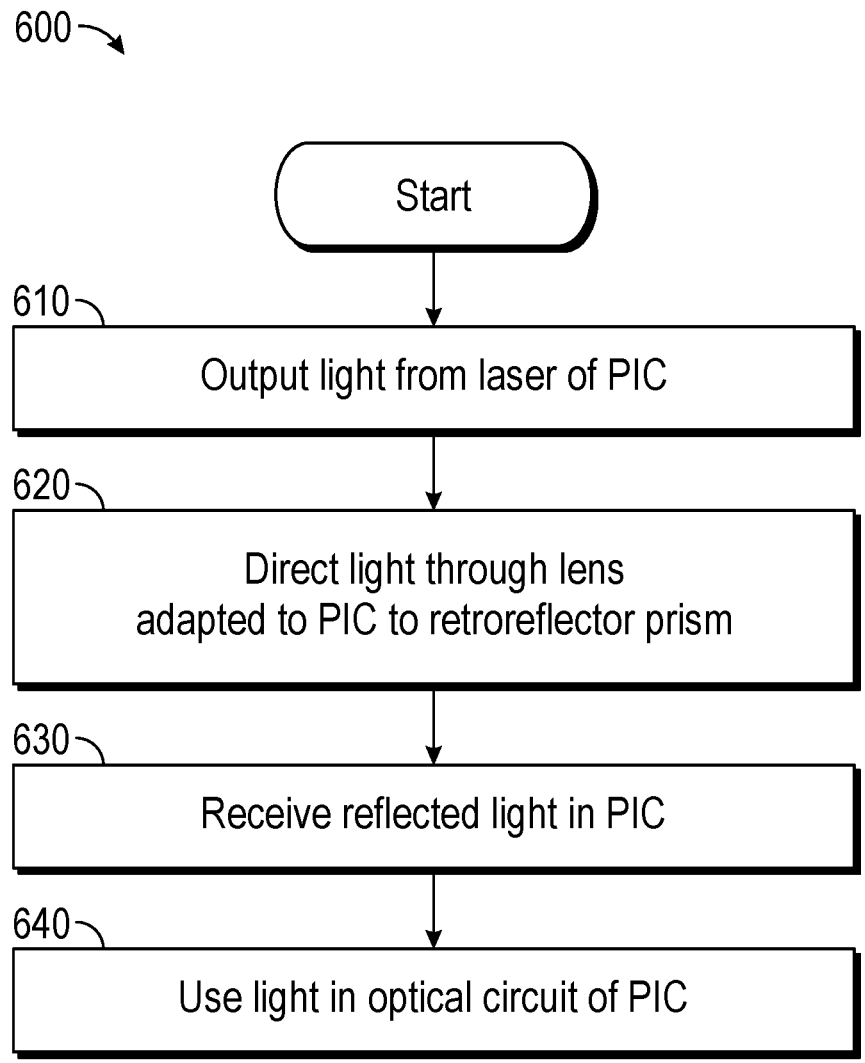
FIG. 6 is a flow diagram of operation of a device according to an embodiment.

Referring now to FIG. 6, shown is a flow diagram of operation of a device according to an embodiment. As illustrated in FIG. 6, method 600 may be performed during normal operation of the device. As shown, operation begins at block 610 by outputting light from a laser of the PIC.

Understand that in various implementations, there may be multiple channels, each associated with a separate laser such that light of the same or independent wavelengths may be communicated along separate waveguides for each of the channels.

Next at block 620 the light may be directed through a lens adapted to the PIC. This light, which may be collimated using the lens, may be directed towards a retroreflector prism, which may be part of a prism assembly closely adapted to the PIC, e.g., as present on a common substrate. Still referring to FIG. 6, next at block 630 the light that is reflected through this prism may be received back in the PIC, e.g., as received through an optical path that includes additional lenses, additional waveguides and so forth. In turn, this reflected light may be provided to an optical circuit where, at block 640, the light may be used within the circuit. For example, this isolated light may be provided to modulators to modulate information for communication, e.g., for purposes of LiDAR object detection, optical communication or so forth. Understand while shown at this high level in the embodiment of FIG. 6, many variations and alternatives are possible.

Figure 7:
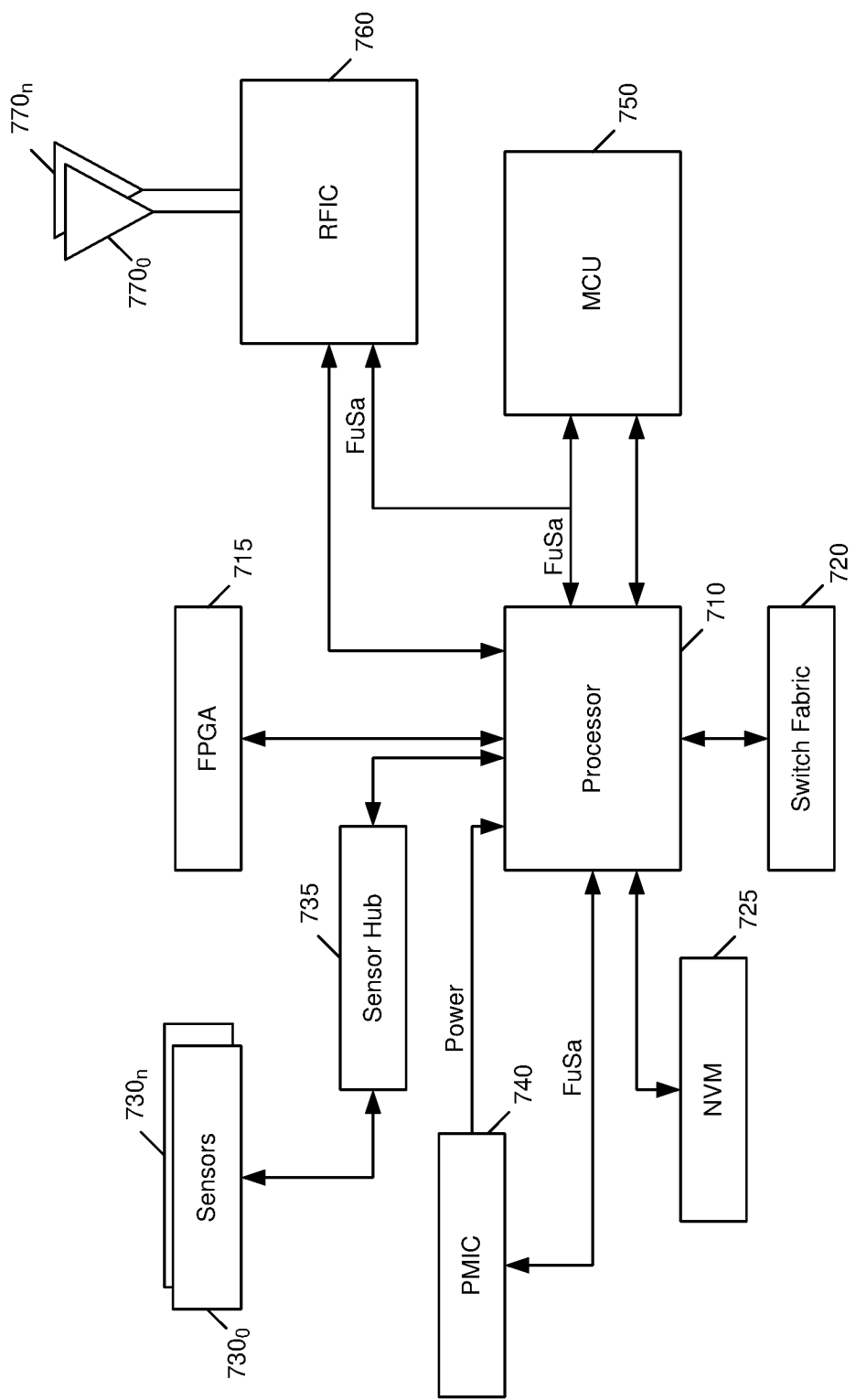
FIG. 7 is a block diagram of a system in accordance with an embodiment.

Referring now to FIG. 7, shown is a block diagram of a system in accordance with an embodiment. In the embodiment of FIG. 7, system 700 is an autonomous driving computing system. As such, system 700 may be implemented within a vehicle that provides for some level of autonomous driving.

As illustrated, system 700 includes a processor 710, which may be a general-purpose multicore processor or other system on chip (SoC). In different implementations, multiple such processors may be implemented to flexibly allocate autonomous driving workloads across these processors. Processor 710 receives power that is controlled by a power management integrated circuit (PMIC) 740. System 700 may further include one or more field programmable gate arrays (FPGAs) 715 or other programmable accelerators to which certain autonomous driving workloads may be offloaded. Processor 710 further couples to a non-volatile memory 725, which in an embodiment may be implemented as a flash memory. To provide communication with other components within a vehicle, processor 710 further couples to a switch fabric 720 which in an embodiment may be implemented as an Ethernet switch fabric that in turn may couple to other components within a vehicle, including display components, vehicle infotainment systems, and so forth.

Still further, processor 710 (and switch fabric 720) also couple to a microcontroller (MCU) 750 which may be involved in functional safety testing. Furthermore, to enable interaction with other systems, including other vehicles, roadway systems, over-the-air update sources, infotainment content sources, sensor data communication and so forth, processor 710 and MCU 750 may couple to one or more radio frequency integrated circuits (RFICs) 760. In embodiments, RFIC 760 may be configured to support 5G-based specifications for communication of automotive and other data via a variety of wireless networks. To this end, RFIC 760 may couple to one or more antennas $770_0$-$770_n$ of a vehicle.

As further illustrated in FIG. 7, system 700 may include a plurality of sensors $730_0$-$730_n$ that provide sensor information, via a sensor hub 735 to processor 710. Although embodiments are not limited in this regard, such sensors may include one or more LIDAR sensors, and which may be formed of packages having a PIC (including on-chip lasers) in association with a prism assembly (further including one or more isolators) as described herein.

In some cases, system 700 may include a rotating LIDAR sensor to monitor an entire vicinity. In other cases, there may be multiple LIDAR sensors, each fixed to monitor a given direction and field of view. These LIDAR sensors may provide image feedback information to processor 710, which may determine a location (e.g., range, and potentially speed) of an object based at least in part on the image feedback information.

Additional sensors may include ultrasound, radar and optical sensors, among other sensor types. Sensor hub 735 may be configured to fuse at least some of this data to provide information regarding the vehicle's surroundings including object detection, range and speed information, for provision to processor 710. In turn, processor 710 and/or FPGA 715 may use this fused sensor information in connection with performing autonomous driving workloads. Understand while shown at this high level in the embodiment of FIG. 7, many variations and alternatives are possible.

Figure 8:
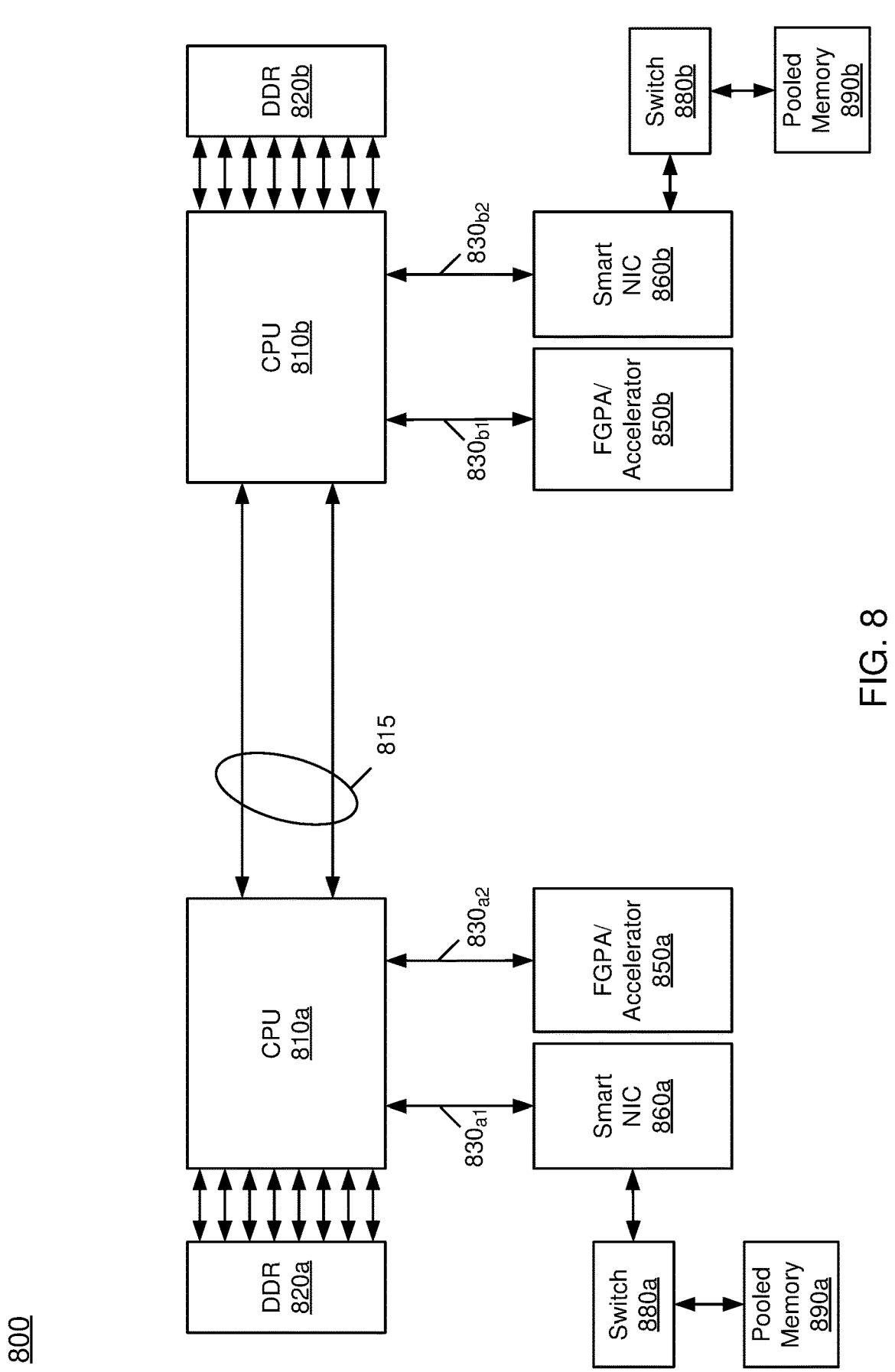
FIG. 8 is a block diagram of a system in accordance with another embodiment.

Embodiments may be used in other systems, such as in connection with optical transceivers that couple together via optical fibers, such as may be present in a datacenter environment. Referring now to FIG. 8, shown is a block diagram of a system in accordance with another embodiment. As shown in FIG. 8, a system 800 may be any type of computing device, and in one embodiment may be a server system that is part of a datacenter. In the embodiment of FIG. 8, system 800 includes multiple central processing units (CPUs) 810a,b that in turn couple to respective system memories 820a,b which in embodiments may be implemented as double data rate (DDR) memory. Note that CPUs 810 may couple together via an interconnect system 815, which in an embodiment can be an optical interconnect that communicates with optical circuitry (which may be included in or coupled to CPUs 810) including optical transceivers having PICs (including on-chip lasers) in association with prism assemblies (further including one or more isolators) as described herein.

To enable coherent accelerator devices and/or smart adapter devices to couple to CPUs 810 by way of potentially multiple communication protocols, a plurality of interconnects 830a1-b2 may be present. In an embodiment, each interconnect 830 may be a given instance of a Compute Express Link (CXL) interconnect.

In the embodiment shown, respective CPUs 810 couple to corresponding field programmable gate arrays (FPGAs)/accelerator devices 850a,b (which may include graphics processing units (GPUs), in one embodiment. In addition CPUs 810 also couple to smart network interface circuit (NIC) devices 860a,b. In turn, smart NIC devices 860a,b couple to switches 880a,b that in turn couple to a pooled memory 890a,b such as a persistent memory. Note that any of the interconnects shown may be implemented as optical fibers that couple to optical transceivers incorporating embodiments.

The following examples pertain to further embodiments.

In one example, an apparatus includes a package having: a substrate; a PIC adapted to the substrate, the PIC including at least one optical circuit, a first plurality of waveguides, a second plurality of waveguides, and a laser to output optical energy via the first plurality of waveguides; and a prism assembly adapted to the substrate to reflect the optical energy output from the first plurality of waveguides to the second plurality of waveguides, the prism assembly including a prism and at least one isolator.

In an example, the prism comprises a retroreflector prism.

In an example, the prism assembly further comprises a polarization rotator.

In an example, the at least one isolator comprises a first isolator having a first magnetization and a second isolator having a second magnetization opposite the first magnetization.

In an example, the prism assembly is adapted to the substrate adjacent to the PIC, the prism assembly separated from the PIC by a separation gap of less than 2 millimeters.

In an example, the at least one optical circuit comprises a LiDAR circuit.

In an example, the at least one optical circuit comprises an optical transceiver.

In an example, the apparatus further comprises a lens assembly adapted to the PIC, the lens assembly including: a first portion adapted on an output optical path between the first plurality of waveguides and the prism assembly; and a second portion adapted on an input optical path between the prism assembly and the second plurality of waveguides.

In an example, the first portion of the lens assembly is heterogenous to the second portion of the lens assembly.

In an example, the apparatus is to provide collimated beams of the optical energy to the prism assembly along the output optical path.

In another example, a method comprises: outputting light generated in a laser of a PIC from the PIC; directing the light through a first lens adapted to the PIC to a retroreflector adjacent the PIC; receiving the light from the retroflector in the PIC, the light isolated via the retroreflector; and using the light in an optical circuit of the PIC.

In an example, the method further comprises receiving the light from the retroreflector through a second lens adapted to the PIC.

In an example, directing the light to the retroreflector further comprises passing the light through a first isolator adapted to the retroreflector.

In an example, receiving the light from the retroreflector further comprises passing the light through a second isolator adapted to the retroreflector.

In an example, using the light in the optical circuit comprises using the light in a LiDAR circuit or a transceiver circuit.

In a further example, a computer readable medium including data is to be used by at least one machine to fabricate at least one integrated circuit to perform the method of any one of the above examples.

In a still further example, an apparatus comprises means for performing the method of any one of the above examples.

In yet another example, a system includes a package and at least one processor coupled to the package. The package may include: a PIC having at least one optical circuit, a first region having a first plurality of waveguides, a second region having a second plurality of waveguides, and at least one laser to output optical energy via the first plurality of waveguides; an isolator adjacent to the first region of the PIC, the isolator to isolate the optical energy communicated through the first plurality of waveguides; and a retroreflector prism adjacent to the isolator, the retroreflector prism to reflect the optical energy output from the first plurality of waveguides to the second plurality of waveguides.

In an example, the system further comprises a polarization rotator adjacent to the retroreflector prism.

In an example, the system further comprises: a first lens assembly adapted to the PIC adjacent to the first region; and a second lens assembly adapted to the PIC adjacent to the second region.

In an example, the first lens assembly has a first numerical aperture and the second lens assembly has a second numerical aperture different than the first numerical aperture.

In an example, the first lens assembly and the second lens assembly are affixed to the PIC via an adhesive material, the isolator is affixed to the retroreflector prism, and the package comprises a substrate. The PIC may have the affixed first lens assembly and the affixed second lens assembly and is adapted to the substrate, and the retroreflector prism may have the affixed isolator and is adapted to the substrate, within a separation gap of less than 2 millimeters from the PIC.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
   a substrate;
   a photonic integrated circuit (PIC) adapted to the substrate, the PIC including at least one optical circuit, a first plurality of waveguides, a second plurality of waveguides, and a laser to output optical energy via the first plurality of waveguides, wherein:
   the first plurality of waveguides has a channel pitch and comprises first end lengths that intersect a first edge of the PIC; and
   the second plurality of waveguides has the same channel pitch, and comprises second end lengths that intersect the first edge of the PIC and are substantially parallel to the first end lengths;
   one or more lens arrays adapted to the PIC, the lens arrays including first lenses in an output optical path of the first plurality of waveguides and second lenses in an input optical path of the second plurality of waveguides; and
   a prism assembly adapted to the substrate, the prism assembly to reflect into the second plurality of waveguides optical energy received from the first plurality of waveguides, the prism assembly including:
   a prism comprising a first surface to receive optical energy emitted into free space by the first lenses, and a second surface to emit into free space optical energy for receipt by the second lenses, wherein the prism comprises a 90° retroreflector prism that turns the optical energy emitted into free space 180° while maintaining parallelism and the channel pitch within the free space between the first and second surfaces of the prism and the lens arrays; and
   at least one optical isolator between the prism and the lens arrays, the optical isolator to block reflected optical energy from returning to the laser.

2. The apparatus of claim 1, wherein the prism assembly further comprises a polarization rotator between the prism and the lens arrays.

3. The apparatus of claim 1, wherein the prism assembly is adapted to the substrate adjacent to a first edge of the PIC, and the prism assembly is separated from the lens array by a free-space gap of less than 2 millimeters.

4. The apparatus of claim 1, wherein the at least one optical circuit comprises a LiDAR circuit.

5. The apparatus of claim 1, wherein the at least one optical circuit comprises an optical transceiver.

6. The apparatus of claim 1, wherein optical energy emitted from the first lenses comprises beams collimated along the output optical path and the optical energy emitted to the second lenses comprise beams collimated along the input optical path.

7. An apparatus comprising:
   a substrate;
   a photonic integrated circuit (PIC) adapted to the substrate, the PIC including at least one optical circuit, a first plurality of waveguides, a second plurality of waveguides, and a laser to output optical energy via the first plurality of waveguides;
   one or more lens arrays adapted to the PIC, the lens arrays including first lenses in an output optical path of the first plurality of waveguides and second lenses in an input optical path of the second plurality of waveguides; and
   a prism assembly adapted to the substrate, the prism assembly to reflect into the second plurality of waveguides optical energy received from the first plurality of waveguides, the prism assembly including:
   a prism comprising a first surface to receive optical energy emitted into free space by the first lenses, and a second surface to emit into free space optical energy for receipt by the second lenses; and
   at least one optical isolator between the prism and the lens arrays, the optical isolator to block reflected optical energy from returning to the laser, wherein the at least one optical isolator comprises:
   a first isolator having a first magnetization, the first isolator between the first lenses and the first surface of the prism; and
   a second isolator having a second magnetization, opposite the first magnetization, the second isolator between the second surface of the prism and the second lenses.

8. An apparatus comprising:
   a substrate;
   a photonic integrated circuit (PIC) adapted to the substrate, the PIC including at least one optical circuit, a first plurality of waveguides, a second plurality of waveguides, and a laser to output optical energy via the first plurality of waveguides;
   one or more lens arrays adapted to the PIC, the lens arrays including first lenses in an output optical path of the first plurality of waveguides and second lenses in an input optical path of the second plurality of waveguides, wherein the first lenses and the second lenses are portions of a single lens array; and
   a prism assembly adapted to the substrate, the prism assembly to reflect into the second plurality of waveguides optical energy received from the first plurality of waveguides, the prism assembly including:
   a prism comprising a first surface to receive optical energy emitted into free space by the first lenses, and a second surface to emit into free space optical energy for receipt by the second lenses; and
   at least one optical isolator between the prism and the lens arrays, the optical isolator to block reflected optical energy from returning to the laser.

9. A method comprising:
   outputting light generated by a laser of a photonic integrated circuit (PIC) from a first waveguide intersecting a first edge of the PIC;
   directing the light through a free-space gap with a first lens adapted to the PIC to illuminate a first surface of a 90° retroreflector adjacent the first edge of the PIC;
   receiving the light from a second surface of the 90° retroreflector into a second lens coupled with a second waveguide intersecting the first edge of the PIC;
   preventing a reflection of the light from returning to the laser with one or more optical isolators positioned between the 90° retroreflector and the first or second lens; and
   using the light in an optical circuit of the PIC.

10. The method of claim 9, further comprising rotating a polarization angle of the light from the retroreflector with a quarter-wave plate positioned between the retroreflector and the second lens.

11. The method of claim 9, wherein directing the light to the retroreflector further comprises passing the light through a first isolator between the first lens and the retroreflector.

12. The method of claim 11, wherein receiving the light from the retroreflector further comprises passing the light through a second isolator between the second lens and the retroreflector.

13. The method of claim 9, wherein using the light in the optical circuit comprises using the light in a LiDAR circuit.

14. A system, comprising:
a package comprising:
- a photonic integrated circuit (PIC) having at least one optical circuit, a first region having a first plurality of waveguides intersecting a first edge of the PIC, a second region having a second plurality of waveguides intersecting the first edge of the PIC, and at least one laser to output optical energy off the PIC via the first plurality of waveguides;
- a single lens array comprising first lenses and second lenses, wherein the first lenses are adjacent to the first edge of the PIC to emit the optical energy into free space;
- an optical isolator adjacent to the first lenses, the optical isolator to prevent a reflection of the optical energy communicated through the first plurality of waveguides from returning to the laser; and
- a retroreflector prism adjacent to the optical isolator, the retroreflector prism to reflect the optical energy output from the first plurality of waveguides into the second plurality of waveguides by way of the second lenses located adjacent to the first edge of the PIC; and
at least one processor coupled to the package.

15. The system of claim 14, further comprising a polarization rotator between the retroreflector prism and the second lenses.

16. The system of claim 14, wherein the first lenses have a first numerical aperture and the second lenses have a second numerical aperture different than the first numerical aperture.

17. The system of claim 14, wherein the first lens and the second lenses are affixed to the PIC via an adhesive material, and the optical isolator is affixed to the retroreflector prism, wherein:
the PIC having the first lenses and the second lenses is adapted to a substrate; the retroreflector prism having the optical isolator is adapted to the substrate; and there is a free-space gap of less than 2 millimeters between the PIC and the isolator.

* * * * *